(12) United States Patent
Gillen et al.

(10) Patent No.: US 10,672,154 B2
(45) Date of Patent: Jun. 2, 2020

(54) 3D TOOLFACE WELLBORE STEERING VISUALIZATION

(71) Applicant: Canrig Drilling Technology Ltd., Houston, TX (US)

(72) Inventors: Colin Gillen, Houston, TX (US); Scott Gilbert Boone, Houston, TX (US)

(73) Assignee: Nabors Drilling Technologies USA, Inc., Houston, TX (US)

(*) Notice: Subject to any disclaimer, the term of this patent is extended or adjusted under 35 U.S.C. 154(b) by 194 days.

(21) Appl. No.: 15/051,753

(22) Filed: Feb. 24, 2016

(65) Prior Publication Data
US 2017/0243383 A1    Aug. 24, 2017

(51) Int. Cl.
| G06T 11/20 | (2006.01) |
| E21B 47/024 | (2006.01) |
| G06F 3/14 | (2006.01) |
| E21B 7/04 | (2006.01) |
| G06T 11/00 | (2006.01) |

(52) U.S. Cl.
CPC .............. *G06T 11/206* (2013.01); *E21B 7/04* (2013.01); *E21B 47/024* (2013.01); *G06F 3/14* (2013.01); *G06T 11/00* (2013.01); *G06T 2215/16* (2013.01)

(58) Field of Classification Search
CPC ................................ G06T 11/206; E21B 7/06
See application file for complete search history.

(56) References Cited

U.S. PATENT DOCUMENTS

| 6,523,623 B1 * | 2/2003 | Schuh ................. E21B 7/04 175/45 |
| 7,630,872 B2 * | 12/2009 | Xia .................... G01V 1/40 367/69 |
| 7,802,634 B2 | 9/2010 | Boone |
| 7,823,655 B2 | 11/2010 | Boone et al. |
| 7,860,593 B2 | 12/2010 | Boone |
| 7,886,844 B2 * | 2/2011 | Phillips ................. E21B 44/00 175/24 |
| 7,938,197 B2 | 5/2011 | Boone et al. |
| 8,199,166 B2 * | 6/2012 | Repin .................. E21B 47/00 345/633 |
| 8,210,283 B1 * | 7/2012 | Benson ................. E21B 7/04 175/26 |
| 8,215,417 B2 | 7/2012 | Annaiyappa et al. |
| 8,360,171 B2 | 1/2013 | Boone et al. |
| 8,386,059 B2 | 2/2013 | Boone |

(Continued)

FOREIGN PATENT DOCUMENTS

WO   WO 2015/061106 A1   4/2015

OTHER PUBLICATIONS

International Search Report and Written Opinion issued for Application No. PCT/US2017/017498, dated May 19, 2017, 22 pgs.

*Primary Examiner* — David J Bagnell
*Assistant Examiner* — Jonathan Malikasim
(74) *Attorney, Agent, or Firm* — Haynes and Boone, LLP

(57) ABSTRACT

Systems, devices, and methods for producing a three-dimensional visualization of a drill plan and drilling motor with a toolface are provided for drill steering purposes. A drilling motor with a toolface in communication with a sensor system is provided. A controller in communication with the sensor system is operable to generate a depiction of the drill plan and a depiction of the drilling motor, and to combine these depictions in a three-dimensional visualization of the downhole environment. This visualization is used by a user to steer the drill.

28 Claims, 9 Drawing Sheets

(56) References Cited

U.S. PATENT DOCUMENTS

| | | |
|---|---|---|
| 8,510,081 B2 | 8/2013 | Boone et al. |
| 8,528,663 B2 | 9/2013 | Boone |
| 8,602,126 B2 | 12/2013 | Boone et al. |
| 8,672,055 B2 | 3/2014 | Boone et al. |
| 8,718,802 B2 | 5/2014 | Boone |
| 2005/0006145 A1 | 1/2005 | Downton |
| 2011/0024187 A1 | 2/2011 | Boone et al. |
| 2011/0024191 A1 | 2/2011 | Boone |
| 2011/0144809 A1 | 6/2011 | Boone |
| 2012/0203525 A1 | 8/2012 | Rodriguez Herrera et al. |
| 2013/0126241 A1 | 5/2013 | Boone et al. |
| 2013/0161097 A1 | 6/2013 | Benson et al. |
| 2013/0206477 A1 | 8/2013 | Boone |
| 2014/0151121 A1 | 6/2014 | Boone et al. |
| 2014/0158428 A1 | 6/2014 | Boone et al. |
| 2015/0107899 A1* | 4/2015 | Fisher, Jr. .............. E21B 49/003 175/27 |
| 2015/0160101 A1 | 6/2015 | Gao et al. |
| 2015/0233792 A1 | 8/2015 | Gao et al. |

\* cited by examiner

3D TOOLFACE WELLBORE STEERING VISUALIZATION

TECHNICAL FIELD

The present disclosure is directed to systems, devices, and methods for visualizing a downhole environment. More specifically, the present disclosure is directed to systems, devices, and methods for producing a three-dimensional visualization of a drill plan and toolface for steering purposes.

BACKGROUND OF THE DISCLOSURE

At the outset of a drilling operation, drillers typically establish a drilling plan that includes a target location and a drilling path to the target location. Once drilling commences, the bottom hole assembly (BHA) may be directed or "steered" from a vertical drilling path in any number of directions, to follow the proposed drilling plan. For example, to recover an underground hydrocarbon deposit, a drilling plan might include a vertical bore to a point above the reservoir, then a directional or horizontal bore that penetrates the deposit. The operator may then follow the plan by steering the BHA through the vertical and horizontal aspects in accordance with the plan.

In slide drilling implementations, such directional drilling requires accurate orientation of a bent housing of the downhole motor. The bent housing is set on surface to a predetermined angle of bend. The high side of this bend is referred to as the toolface of the BHA. In such slide drilling implementations, rotating the drill string changes the orientation of the bent housing and the BHA, and thus the toolface. To effectively steer the assembly, the operator must first determine the current toolface orientation, such as via measurement-while-drilling (MWD) apparatus. Thereafter, if the drilling direction needs adjustment, the operator must rotate the drill string to change the toolface orientation. In rotary steerable system implementations, the operator still must determine the current toolface orientation.

During drilling, a "survey" identifying locational and directional data of a BHA in a well is obtained at various intervals. Each survey yields a measurement of the inclination angle from vertical and azimuth (or compass heading) of the survey probe in a well (typically 40-50 feet behind the total depth at the time of measurement). In directional wellbores, particularly, the position of the wellbore must be known with reasonable accuracy to ensure the correct steering of the wellbore path. The measurements themselves include inclination from vertical and the azimuth of the well bore. In addition to the toolface data, and inclination, and azimuth, the data obtained during each survey may also include hole depth data, pipe rotational data, hook load data, delta pressure data (across the downhole drilling motor), and modeled dogleg data, for example.

These measurements may be taken at discrete points in the well, and the approximate path of the wellbore may be computed from the data obtained at these discrete points. Conventionally, a standard survey is conducted at each drill pipe connection, at approximately every 90 feet, to obtain an accurate measurement of inclination and azimuth for the new survey position.

When deviation from the planned drilling path occurs, drillers must consider the information available to them and then direct the drill back to the original path. This typically requires the operator to manipulate the drawworks brake and rotate the rotary table or top drive quill to find the precise combinations of hook load, mud motor differential pressure, and drill string torque, to properly position the toolface. This can be difficult, time consuming, and complex. Each adjustment has different effects on the toolface orientation, and each must be considered in combination with other drilling requirements to drill the hole. Thus, reorienting the toolface in a bore is very complex, labor intensive, and often inaccurate. Furthermore, information required to steer the drilling BHA is generally transmitted to the operator in a textual format in conventional systems. An operator must consider the implications of this textual information, formulate a visual mental impression of the overall orientation of the drilling BHA, and try to formulate a steering plan based on this mental impression, before steering the system. A more efficient, reliable, and intuitive method for steering a BHA is needed.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
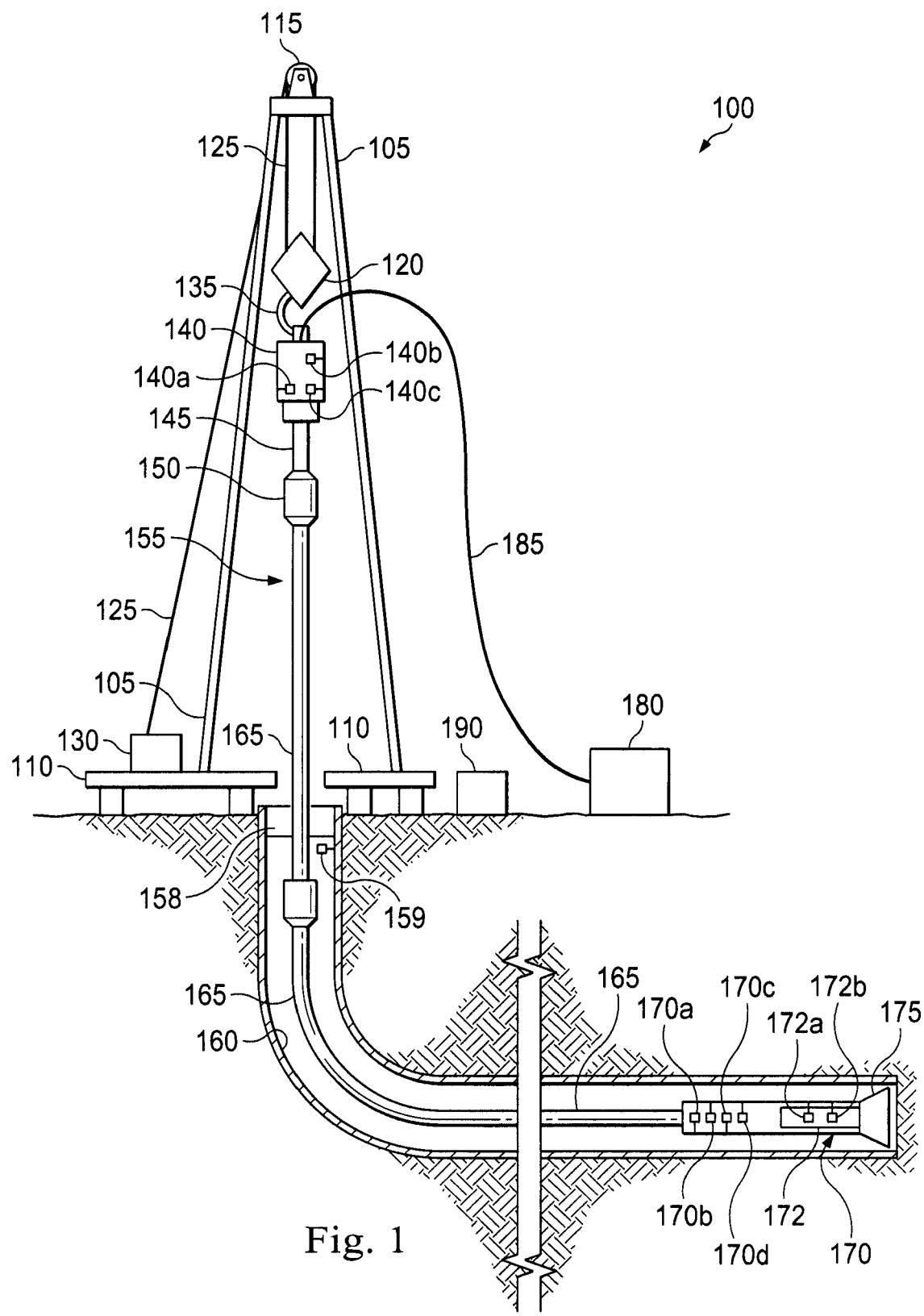
FIG. 1 is a schematic of an exemplary drilling apparatus according to one or more aspects of the present disclosure.

It is to be understood that the following disclosure provides many different implementations, or examples, for implementing different features of various implementations. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various implementations and/or configurations discussed.

The systems and methods disclosed herein provide more intuitive control of BHAs. In particular, the present disclosure provides for the creation and implementation of a three-dimensional visualization of the downhole environment, including depictions of the location and orientation of the BHA and a drill plan. The visualization may also include a toolface dial superimposed on the depiction of the BHA, replicating parameters set by a surface control system and including real time toolface angle data. These depictions may be created from data received by sensors associated with the drill systems as well as other input data.

In particular, a target location is typically identified before drilling commences, and an optimal wellbore profile or drill plan is established. Such proposed drill plans are generally based upon the most efficient or effective path to the target location or locations. As drilling proceeds, the BHA might begin to deviate from the optimal drill plan for one or more of a variety of factors. The systems and methods disclosed herein may allow an operator to visualize the location of the BHA and the drill plan, and in some cases, steer the BHA back to the drilling path along an optimized route. The three-dimensional visualization may also be continuously updated to give the drill operator a real-time view of the downhole environment. In some implementations, the three-dimensional visualization may be used for training purposes or to improve the speed and accuracy of drilling operations by providing more intuitive control of the BHA than conventional systems.

Referring to FIG. 1, illustrated is a schematic view of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel in and out the drilling line 125 to cause the traveling block 120 to be lowered and raised relative to the rig floor 110. The other end of the drilling line 125, known as a dead line anchor, is anchored to a fixed position, possibly near the drawworks 130 or elsewhere on the rig.

A hook 135 is attached to the bottom of the traveling block 120. A top drive 140 is suspended from the hook 135. A quill 145 extending from the top drive 140 is attached to a saver sub 150, which is attached to a drill string 155 suspended within a wellbore 160. Alternatively, the quill 145 may be attached to the drill string 155 directly. The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 includes interconnected sections of drill pipe 165, a bottom hole assembly (BHA) 170, and a drill bit 175. The BHA 170 may include stabilizers, drill collars, and/or measurement-while-drilling (MWD) or wireline conveyed instruments, among other components. For the purpose of slide drilling the drill string may include a downhole motor with a bent housing or other bend component, operable to create an off-center departure of the bit from the center line of the wellbore. The direction of this departure in a plane normal to the wellbore is referred to as the toolface angle or toolface. The drill bit 175, which may also be referred to herein as a "tool," or a "toolface," may be connected to the bottom of the BHA 170 or otherwise attached to the drill string 155. One or more pumps 180 may deliver drilling fluid to the drill string 155 through a hose or other conduit, which may be connected to the top drive 140.

The downhole MWD or wireline conveyed instruments may be configured for the evaluation of physical properties such as pressure, temperature, torque, weight-on-bit (WOB), vibration, inclination, azimuth, toolface orientation in three-dimensional space, and/or other downhole parameters. These measurements may be made downhole, stored in memory, such as solid-state memory, for some period of time, and downloaded from the instrument(s) when at the surface and/or transmitted in real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, transmission as electromagnetic pulses, among other methods. The MWD sensors or detectors and/or other portions of the BHA 170 may have the ability to store measurements for later retrieval via wireline and/or when the BHA 170 is tripped out of the wellbore 160.

In an exemplary implementation, the apparatus 100 may also include a rotating blow-out preventer (BOP) 158 that may assist when the well 160 is being drilled utilizing under-balanced or managed-pressure drilling methods. The apparatus 100 may also include a surface casing annular pressure sensor 159 configured to detect the pressure in an annulus defined between, for example, the wellbore 160 (or casing therein) and the drill string 155.

In the exemplary implementation depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 also includes a controller 190 configured to control or assist in the control of one or more components of the apparatus 100. For example, the controller 190 may be configured to transmit operational control signals to the draw works 130, the top drive 140, the BHA 170 and/or the pump 180. The controller 190 may be a stand-alone component installed near the mast 105 and/or other components of the apparatus 100. In an exemplary implementation, the controller 190 includes one or more systems located in a control room in communication with the apparatus 100, such as the general purpose shelter often referred to as the "doghouse" serving as a combination tool shed, office, communications center, and general meeting place. The controller 190 may be configured to transmit the operational control signals to the draw works 130, the top drive 140, the BHA 170, and/or the pump 180 via wired or wireless transmission means which, for the sake of clarity, are not depicted in FIG. 1.

The controller 190 is also configured to receive electronic signals via wired or wireless transmission means (also not shown in FIG. 1) from a variety of sensors included in the apparatus 100, where each sensor is configured to detect an operational characteristic or parameter. Depending on the implementation, the apparatus 100 may include a downhole annular pressure sensor 170a coupled to or otherwise associated with the BHA 170. The downhole annular pressure sensor 170a may be configured to detect a pressure value or range in an annulus shaped region defined between the external surface of the BHA 170 and the internal diameter of the wellbore 160, which may also be referred to as the casing pressure, downhole casing pressure, MWD casing pressure, or downhole annular pressure. Measurements from the downhole annular pressure sensor 170a may include both static annular pressure (pumps off) and active annular pressure (pumps on).

It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

The apparatus 100 may additionally or alternatively include a shock/vibration sensor 170b that is configured to detect shock and/or vibration in the BHA 170. The apparatus 100 may additionally or alternatively include a mud motor delta pressure (ΔP) sensor 172a that is configured to detect a pressure differential value or range across one or more motors 172 of the BHA 170. The one or more motors 172 may each be or include a positive displacement drilling motor that uses hydraulic power of the drilling fluid to drive the drill bit 175, also known as a mud motor. One or more torque sensors 172b may also be included in the BHA 170 for sending data to the controller 190 that is indicative of the torque applied to the drill bit 175 by the one or more motors 172.

The apparatus 100 may additionally or alternatively include a toolface sensor 170c configured to detect the current toolface orientation. The toolface sensor 170c may be or include a conventional or future-developed magnetic toolface sensor which detects toolface orientation relative to magnetic north. Alternatively, or additionally, the toolface sensor 170c may be or include a conventional or future-developed gravity toolface sensor which detects toolface orientation relative to the Earth's gravitational field. The toolface sensor 170c may also, or alternatively, be or include a conventional or future-developed gyro sensor. The apparatus 100 may additionally or alternatively include a WOB sensor 170d integral to the BHA 170 and configured to detect WOB at or near the BHA 170.

The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The top drive 140 may additionally or alternatively include or otherwise be associated with a speed sensor 140b configured to detect a value or range of the rotational speed of the quill 145.

The top drive 140, draw works 130, crown or traveling block, drilling line or dead line anchor may additionally or alternatively include or otherwise be associated with a WOB sensor 140c (WOB calculated from a hook load sensor that can be based on active and static hook load) (e.g., one or more sensors installed somewhere in the load path mechanisms to detect and calculate WOB, which can vary from rig-to-rig) different from the WOB sensor 170d. The WOB sensor 140c may be configured to detect a WOB value or range, where such detection may be performed at the top drive 140, drawworks 130, or other component of the apparatus 100.

The detection performed by the sensors described herein may be performed once, continuously, periodically, and/or at random intervals. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

Figure 2:
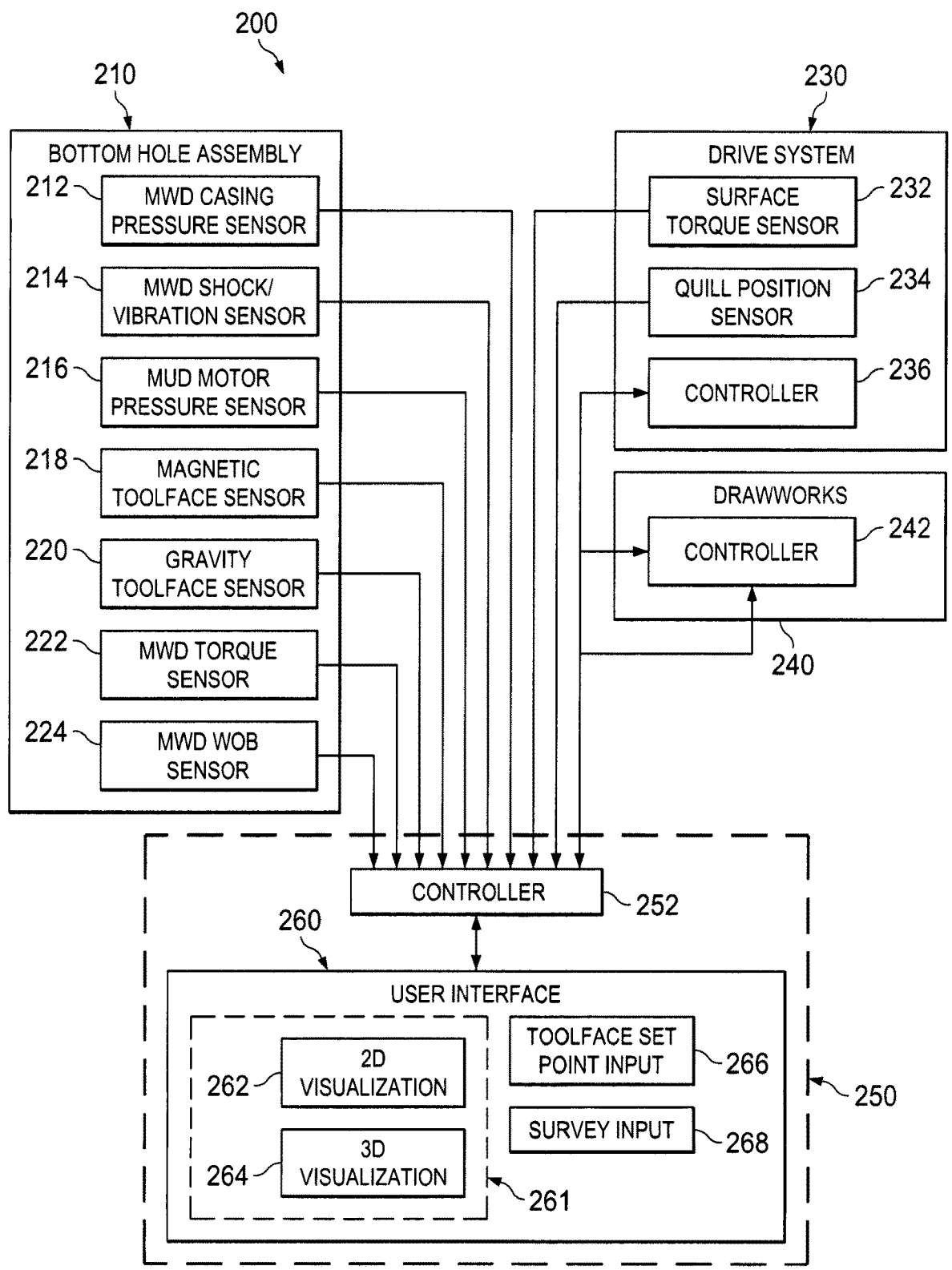
FIG. 2 is a schematic of an exemplary sensor system according to one or more aspects of the present disclosure.

Referring to FIG. 2, illustrated is a block diagram of an apparatus 200 according to one or more aspects of the present disclosure. The apparatus 200 includes a user interface 260, a bottom hole assembly (BHA) 210, a drive system 230, a drawworks 240, and a controller 252. The apparatus 200 may be implemented within the environment and/or apparatus shown in FIG. 1. For example, the BHA 210 may be substantially similar to the BHA 170 shown in FIG. 1, the drive system 230 may be substantially similar to the top drive 140 shown in FIG. 1, the drawworks 240 may be substantially similar to the drawworks 130 shown in FIG. 1, and the controller 252 may be substantially similar to the controller 190 shown in FIG. 1.

The user interface 260 and the controller 252 may be discrete components that are interconnected via wired or wireless means. Alternatively, the user interface 260 and the controller 252 may be integral components of a single system or controller 250, as indicated by the dashed lines in FIG. 2.

The user interface 260 may include data input means 266 for user input of one or more toolface set points, and may also include means for data input of other set points, limits, and other input data. The data input means 266 may include a keypad, voice-recognition apparatus, dial, button, switch, slide selector, toggle, joystick, mouse, data base and/or other conventional or future-developed data input device. Such data input means 266 may support data input from local and/or remote locations. Alternatively, or additionally, the data input means 266 may include means for user-selection of predetermined toolface set point values or ranges, such as via one or more drop-down menus. The toolface set point data may also or alternatively be selected by the controller 252 via the execution of one or more database look-up procedures. In general, the data input means 266 and/or other components within the scope of the present disclosure support operation and/or monitoring from stations on the rig site as well as one or more remote locations with a communications link to the system, network, local area network (LAN), wide area network (WAN), Internet, satellite-link, and/or radio, among other means.

The user interface 260 may also include a survey input 268. The survey input 268 may include information gathered from sensors regarding the orientation and location of the BHA 210. In some implementations, survey input 268 is automatically entered into the user interface at regular intervals.

The user interface 260 may also include a display device 261 arranged to present a two-dimensional visualization 262 and a three-dimensional visualization 264 for visually presenting information to the user in textual, graphic, or video form. In some implementations, the two-dimensional visualization 262 and the three-dimensional visualization 264 include one or more depictions. As used herein, a "depiction" is a two-dimensional or three-dimensional graphical representation of an object (such as a BHA) or other data (such as a drill plan) which may be input into the user interface 260. These depictions may be figurative, and may be accompanied by data in a textual format. As used herein, a "visualization" is a two-dimensional or three-dimensional user-viewable representation of one or more depictions. In some implementations, a visualization is a control interface. For example, the two-dimensional visualization 262 may be utilized by the user to view sensor data and input the toolface set point data in conjunction with the data input means 266. The toolface set point data input means 266 may be integral to or otherwise communicably coupled with the two-dimensional visualization 262. In other implementations, a visualization is a representation of an environment from the viewpoint of a simulated camera. This viewpoint may be zoomed in or out, moved, or rotated to view different aspects of one or more depictions. For example, the three-dimensional visualization 264 may show a downhole environment including depictions of the BHA and drill plan. Furthermore, the downhole environment may include information from a control interface overlaid on depictions of the BHA and drill plan. The two-dimensional visualization 262 and three-dimensional visualization 264 will be discussed in further detail in conjunction with FIGS. 3 and 4.

The three-dimensional visualization 264 may incorporate information shown on the two-dimensional visualization 262. In some cases, the three-dimensional visualization 264 includes a two-dimensional visualization 262 overlaid on a three-dimensional visualization of the downhole environment which may include a depiction of a drill plan.

The BHA 210 may include an MWD casing pressure sensor 212 that is configured to detect an annular pressure value or range at or near the MWD portion of the BHA 210, and that may be substantially similar to the downhole annular pressure sensor 170a shown in FIG. 1. The casing pressure data detected via the MWD casing pressure sensor 212 may be sent via electronic signal to the controller 252 via wired or wireless transmission.

The BHA 210 may also include an MWD shock/vibration sensor 214 that is configured to detect shock and/or vibration in the MWD portion of the BHA 210, and that may be substantially similar to the shock/vibration sensor 170b shown in FIG. 1. The shock/vibration data detected via the MWD shock/vibration sensor 214 may be sent via electronic signal to the controller 252 via wired or wireless transmission.

The BHA 210 may also include a mud motor pressure (ΔP) sensor 216 that is configured to detect a pressure differential value or range across the mud motor of the BHA 210, and that may be substantially similar to the mud motor ΔP sensor 172a shown in FIG. 1. The pressure differential data detected via the mud motor ΔP sensor 216 may be sent via electronic signal to the controller 252 via wired or wireless transmission. The mud motor ΔP may be alternatively or additionally calculated, detected, or otherwise determined at the surface, such as by calculating the difference between the surface standpipe pressure just off-bottom and pressure once the bit touches bottom and starts drilling and experiencing torque.

The BHA 210 may also include a magnetic toolface sensor 218 and a gravity toolface sensor 220 that are cooperatively configured to detect the current toolface, and that collectively may be substantially similar to the toolface sensor 170c shown in FIG. 1. The magnetic toolface sensor 218 may be or include a conventional or future-developed magnetic toolface sensor which detects toolface orientation relative to magnetic north. The gravity toolface sensor 220 may be or include a conventional or future-developed gravity toolface sensor which detects toolface orientation relative to the Earth's gravitational field. In an exemplary implementation, the magnetic toolface sensor 218 may detect the current toolface when the end of the wellbore is less than about 7° from vertical, and the gravity toolface sensor 220 may detect the current toolface when the end of the wellbore is greater than about 7° from vertical. However, other toolface sensors may also be utilized within the scope of the present disclosure, including non-magnetic toolface sensors and non-gravitational inclination sensors. In any case, the toolface orientation detected via the one or more toolface sensors (e.g., magnetic toolface sensor 218 and/or gravity toolface sensor 220) may be sent via electronic signal to the controller 252 via wired or wireless transmission.

The BHA 210 may also include an MWD torque sensor 222 that is configured to detect a value or range of values for torque applied to the bit by the motor(s) of the BHA 210, and that may be substantially similar to the torque sensor 172b shown in FIG. 1. The torque data detected via the MWD torque sensor 222 may be sent via electronic signal to the controller 252 via wired or wireless transmission. The BHA 210 may also include a MWD WOB sensor 224 that is configured to detect a value or range of values for WOB at or near the BHA 210, and that may be substantially similar to the WOB sensor 170d shown in FIG. 1. The WOB data detected via the MWD WOB sensor 224 may be sent via electronic signal to the controller 252 via wired or wireless transmission.

The drawworks 240 may include a controller 242 and/or other means for controlling feed-out and/or feed-in of a drilling line (such as the drilling line 125 shown in FIG. 1). Such control may include rotational control of the drawworks (in v. out) to control the height or position of the hook, and may also include control of the rate the hook ascends or descends.

The drive system 230 includes a surface torque sensor 232 that is configured to detect a value or range of the reactive torsion of the quill or drill string, much the same as the torque sensor 140a shown in FIG. 1. The drive system 230 also includes a quill position sensor 234 that is configured to detect a value or range of the rotational position of the quill, such as relative to true north or another stationary reference. The surface torsion and quill position data detected via the surface torque sensor 232 and the quill position sensor 234, respectively, may be sent via electronic signal to the controller 252 via wired or wireless transmission. The drive system 230 also includes a controller 236 and/or other means for controlling the rotational position, speed and direction of the quill or other drill string component coupled to the drive system 230 (such as the quill 145 shown in FIG. 1).

The controller 252 is configured to receive one or more of the above-described parameters from the user interface 260, the BHA 210, the drawworks 240, and/or the drive system 230, and utilize such parameters to continuously, periodically, or otherwise determine the current toolface orientation. The controller 252 may be further configured to generate a control signal, such as via intelligent adaptive control, and provide the control signal to the drive system 230 and/or the drawworks 240 to adjust and/or maintain the toolface orientation. For example, the controller 252 may provide one or more signals to the drive system 230 and/or the drawworks 240 to increase or decrease WOB and/or quill position, such as may be required to accurately "steer" the drilling operation.

Figure 3:
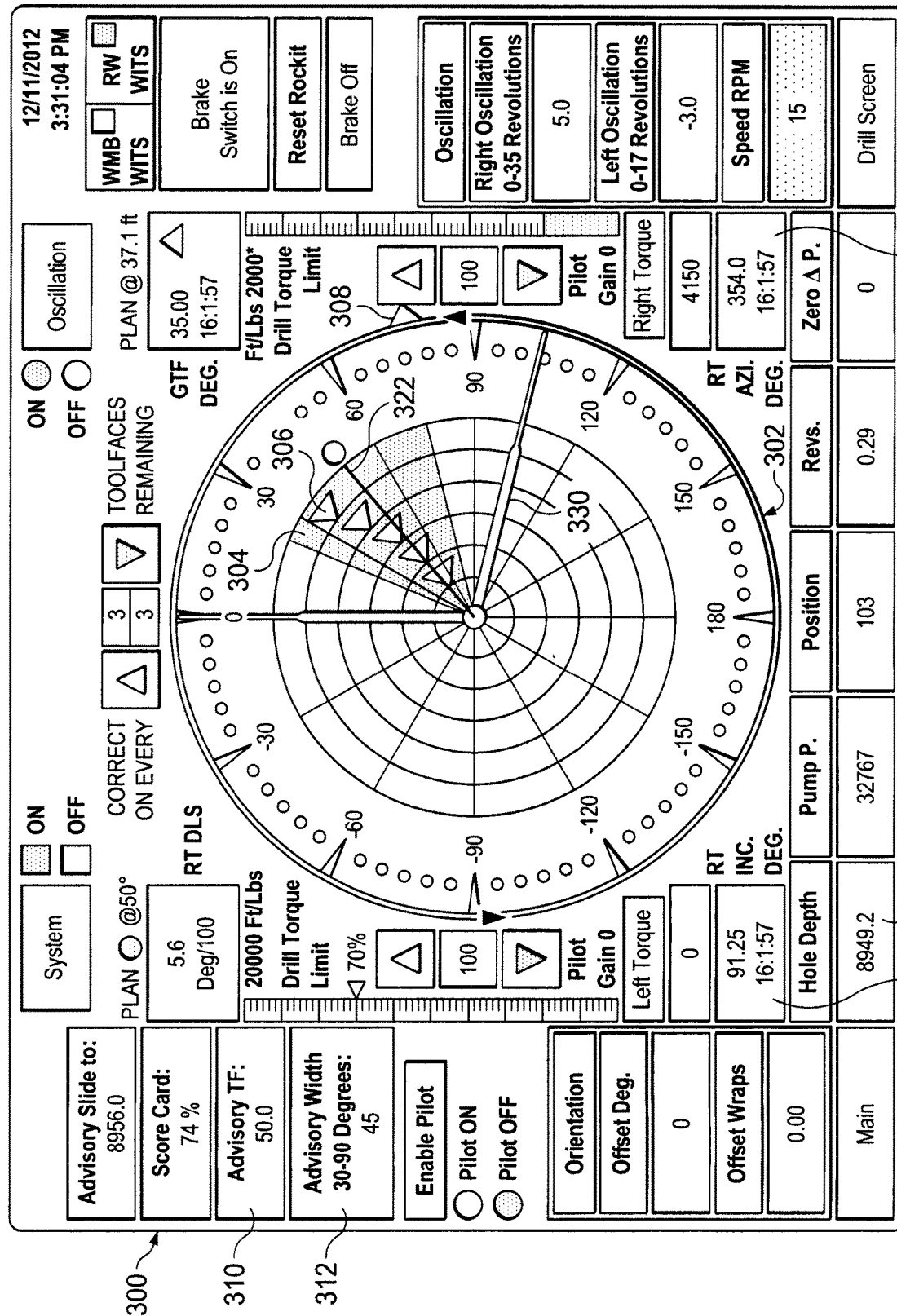
FIG. 3 is a schematic of an exemplary display apparatus showing a two-dimensional visualization.

FIG. 3 shows a schematic view of a human-machine interface (HMI) 300 according to one or more aspects of the present disclosure. The HMI 300 may be utilized by a human operator during directional and/or other drilling operations to monitor the relationship between toolface orientation and quill position. The HMI 300 may include aspects of the ROCKit® HMI display of Canrig Drilling Technology, LTD. In an exemplary implementation, the HMI 300 is one of several display screens selectably viewable by the user during drilling operations, and may be included as or within the human-machine interfaces, drilling operations and/or drilling apparatus described in the systems herein. The HMI 300 may also be implemented as a series of instructions recorded on a computer-readable medium, such as described in one or more of these references. In some implementations, the HMI 300 is the two-dimensional visualization 262 of FIG. 2.

The HMI 300 is used by a user, who may be a directional driller, while drilling to monitor the BHA in three-dimensional space. The controller 252 of FIG. 2 may drive one or more other human-machine interfaces during drilling operation may be configured to also display the HMI 300. The controller 252 driving the HMI 300 may include a "survey" or other data channel, or otherwise includes means for receiving and/or reading sensor data relayed from the BHA 170, a measurement-while-drilling (MWD) assembly, and/or other drilling parameter measurement means, where such relay may be via the Wellsite Information Transfer Standard (WITS), WITS Markup Language (WITS ML), and/or another data transfer protocol. Such electronic data may include gravity-based toolface orientation data, magnetic-based toolface orientation data, azimuth toolface orientation data, and/or inclination toolface orientation data, among others.

As shown in FIG. 3, the HMI 300 may be depicted as substantially resembling a dial or target shape 302 having a plurality of concentric nested rings. The HMI 300 also includes a pointer 330 representing the quill position. Symbols for magnetic toolface data and gravity toolface data symbols may also be shown. In the example of FIG. 3, gravity toolface angles are depicted as toolface symbols 306. In one exemplary implementation, the symbols for the magnetic toolface data are shown as circles and the symbols for the gravity toolface data are shown as rectangles. Of course, other shapes may be utilized within the scope of the present disclosure. The toolface symbols 306 may also or alternatively be distinguished from one another via color, size, flashing, flashing rate, and/or other graphic means.

In some implementations, the toolface symbols 306 may indicate only the most recent toolface measurements. However, as in the exemplary implementation shown in FIG. 3, the HMI 300 may include a historical representation of the toolface measurements, such that the most recent measurement and a plurality of immediately prior measurements are displayed. Thus, for example, each ring in the HMI 300 may represent a measurement iteration or count, or a predetermined time interval, or otherwise indicate the historical relation between the most recent measurement(s) and prior measurement(s). In the exemplary implementation shown in FIG. 3, there are five such rings in the dial 302 (the outermost ring being reserved for other data indicia), with each ring representing a data measurement or relay iteration or count. The toolface symbols 306 may each include a number indicating the relative age of each measurement. In the present example, the outermost triangle of the toolface symbols 306 corresponds to the most recent measurement. After the most recent measurement, previous measurements are positioned incrementally towards the center of the dial 302. In other implementations, color, shape, and/or other indicia may graphically depict the relative age of measurement. Although not depicted as such in FIG. 3, this concept may also be employed to historically depict the quill position data. In some implementations, measurements are taken every 10 seconds, although depending on the implementation, measurements may be taken at time periods ranging from every second to every half-hour. Other time periods are also contemplated.

The HMI 300 may also include a number of textual and/or other types of indicators 316, 318, 320 displaying parameters of the current or most recent toolface orientation. For example, indicator 316 shows the inclination of the wellbore, measured by the survey instrument, as 91.25°. Indicator 318 shows the azimuth of the wellbore, measured by the survey instrument as 354°. Indicator 320 shows the hole depth of the wellbore as 8949.2 feet. In the exemplary implementation shown, the HMI 300 may include a programmable advisory width. In the example of FIG. 3, this value is depicted by advisory width sector 304 with an adjustable angular width corresponding to an angular setting shown in the corresponding indicator 312, in this case 45°. The advisory width is a visual indicator providing the user with a range of acceptable deviation from the advisory toolface direction. In the example of FIG. 3, the toolface symbols 306 all lie within the advisory width sector 304, meaning that the user is operating within acceptable deviation limits from the advisory toolface direction. Indicator 310 gives an advisory toolface direction, corresponding to line 322. The advisory toolface direction represents an optimal direction towards the drill plan. Indicator 308, shown in FIG. 3 as an arrow on the outermost edge of the dial 302, is an indicator of the overall resultant direction of travel of the toolface. This indicator 308 may present an orientation that averages the values of other indicators 316, 318, 320. Other values and depictions are included on the HMI 300 that are not discussed herein. These other values include the time and date of drilling, aspects relating to the operation of the drill, and other received sensor data.

Figure 4:
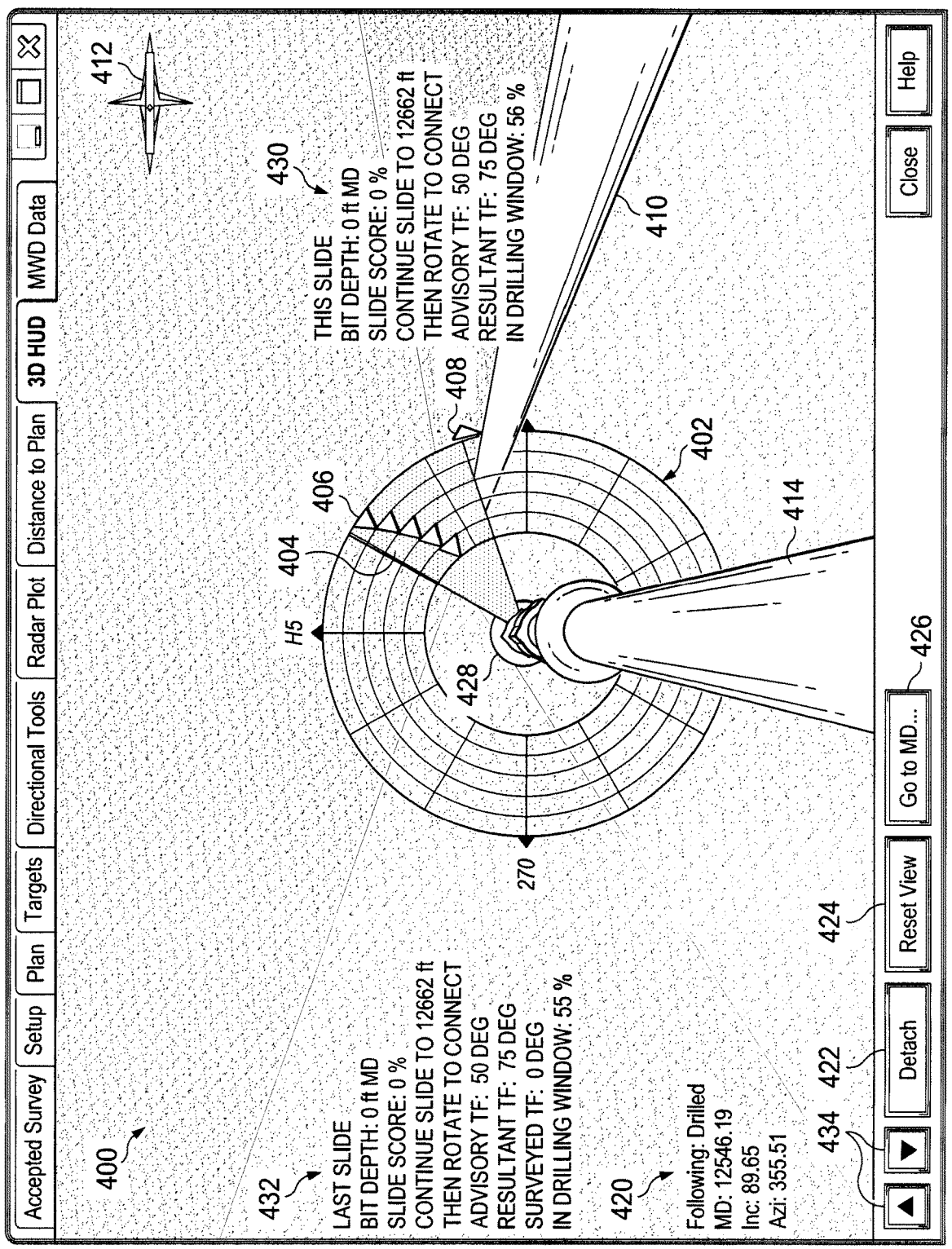
FIG. 4 is a representation of an exemplary display apparatus showing a three-dimensional visualization according to one or more aspects of the present disclosure.

FIG. 4 is an exemplary representation of an HMI 400 configured to relay information about the toolface location and orientation to a user. This display may be the three-dimensional visualization 264 of FIG. 2. In the example of FIG. 4, the HMI 400 includes three-dimensional depictions of a drill plan 410, a drilling motor and drilling bit 428, and a drill history 414, as well as two-dimensional depictions. The HMI 400 may be used by an operator to gain an intuitive view of the BHA and drill plan. In some implementations, the HMI 400 shows a "camera view" of the downhole environment, or the view that a simulated camera would show if imaging aspects of the downhole environment. In particular, the depiction of the drill plan 410 may appear as a long, cylindrical string extending through the downhole environment. The depiction of the drill plan 410 may be created in the three-dimensional display based on data of a desired drill plan entered or otherwise uploaded by the user.

The depiction of the toolface angle at the drilling bit 428 appears as symbols 406 on the concentric circular grid 402 in the example of FIG. 4. This depiction shows the last recorded or measured location of the toolface and may include information about its orientation. In one implementation, data concerning the location and orientation of the drilling bit 428 are shown in index 420. In the example of FIG. 4, the index 420 indicates that the most recent depth of the drilling bit 428 was measured at 12546.19 feet, the inclination was 89.65°, and the azimuth was 355.51°. In some instances, the depiction of the drilling bit 428 is centered in the HMI 400, as shown in FIG. 4. In other implementations, index 420 contains data about the location and orientation of the simulated camera whose view is depicted in HMI 400.

A three-dimensional compass 412 shows the orientation of the present view of the HMI 400, and is an indication of an x-y-z coordinate system. The depiction of the drill history 414 extends outward from the depiction of the drilling bit 428. In some cases, the drill history 414 can depict the location of the drill string along with previous measurements of the location and orientation of the toolface. Spheres located along the drill history 414 may show the location of previous surveys taken during the drilling process. In some cases, these surveys are taken at regular intervals along the wellbore. Furthermore, real-time measurements are made ahead of the last standard survey, and can give the user feedback on the progress and effectiveness of a slide or rotation procedure. These measurements may be used to update aspects of the visualization such as the drill history 414 and concentric circular grid 402, advisory segment 404, symbols 406, and indicator 408.

In some implementations, two-dimensional aspects of the HMI 300 are overlaid on the three-dimensional visualization of HMI 400. In the example of FIG. 4, the concentric circular grid 402, advisory segment 404, symbols 406, and indicator 408 are overlaid on the three-dimensional visualization. In the example of FIG. 4, the concentric circular grid 402, advisory segment 404, symbols 406, and indicator 408 are centered on the depiction of the drilling bit 428. In some implementations, the concentric circular grid 402, advisory segment 404, and symbols 406 of HMI 400 correspond directly with the dial 302, advisory width sector 304, toolface symbols 306, and indicator 308 of HMI 300 in FIG. 3 and represent the same or similar data. As such, the concentric circular grid 402, advisory segment 404, symbols 406, and indicator 408 are not described further with respect to FIG. 4. Note that indicator 408 may be alternatively depicted as a vector arrow such as those in FIGS. 5 and 6.

Still referring to FIG. 4, index 430 shows data from the most recent movement of the drilling bit and toolface. Index 430 may include a current drilling bit depth measurement, a slide score, suggested corrective actions to align the BHA with the drill plan, and advisory measurements. In some implementations, the HMI 400 may be used to provide feedback to a user in steering accuracy. The effectiveness of steering the actual toolface may be judged by a slide score.

Index 432 shows data from past movements of the toolface. In the example of FIG. 4, index 432 includes data from the last most recent section of the toolface steering, or sliding. Index 432 may contain similar data to that of 430. In some cases, indexes 430 and 432 allow the user to track the movement of the drilling motor as it is steered through the downhole environment.

HMI 400 also includes functions to adjust the three-dimensional view of the HMI 400. In particular, functions 422, 424, 426, and 434 allow a user to reorient the HMI 400 to view different aspects of the toolface or drill plan. In the example of FIG. 4, the view of the HMI 400 is centered on the drill history 414 with the depiction of the drilling bit 428 at the center. Function 422 removes the view of the HMI 400 from the drill history 414, which may be represented as "detaching" the simulated camera from the drill history 414 (or alternatively, the drill string). Function 424 resets the view of the HMI 400 to the view depicted in FIG. 4 with the display centered on the drill history 414. Function 426 reorients the view of HMI 400 to the bottom of the drill history 414 with the depiction of the drilling bit 428 in the center. Function 434, which includes arrow symbols, may be used to reorient the view of the HMI 400 to different positions along the drill history 414. In some implementations, function 434 allows a user to travel up and down a depiction of the previous locations of the toolface and/or a depiction of the drill string.

Figure 5:
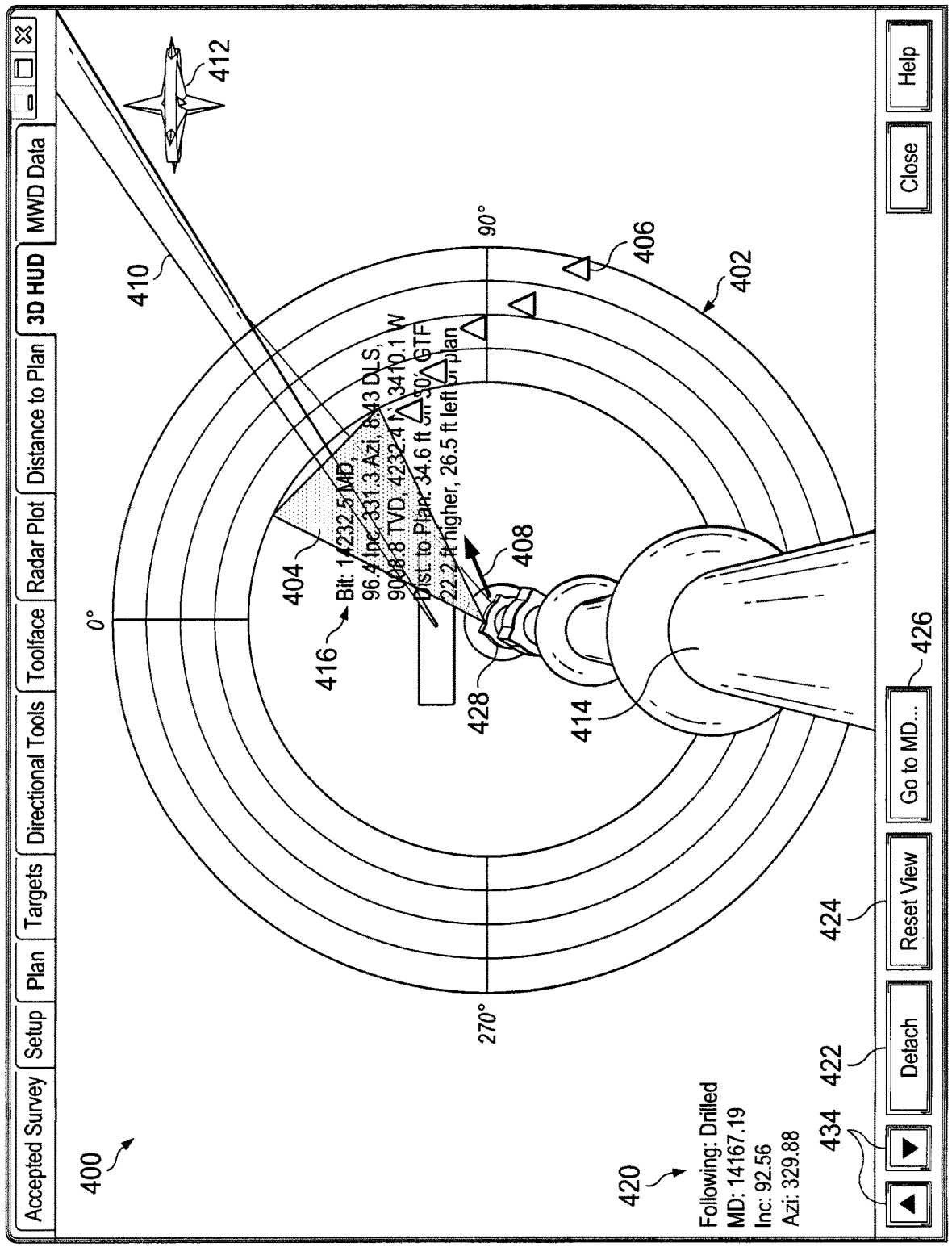
FIG. 5 is a representation of an exemplary display apparatus showing another three-dimensional visualization according to one or more aspects of the present disclosure.
Figure 6:
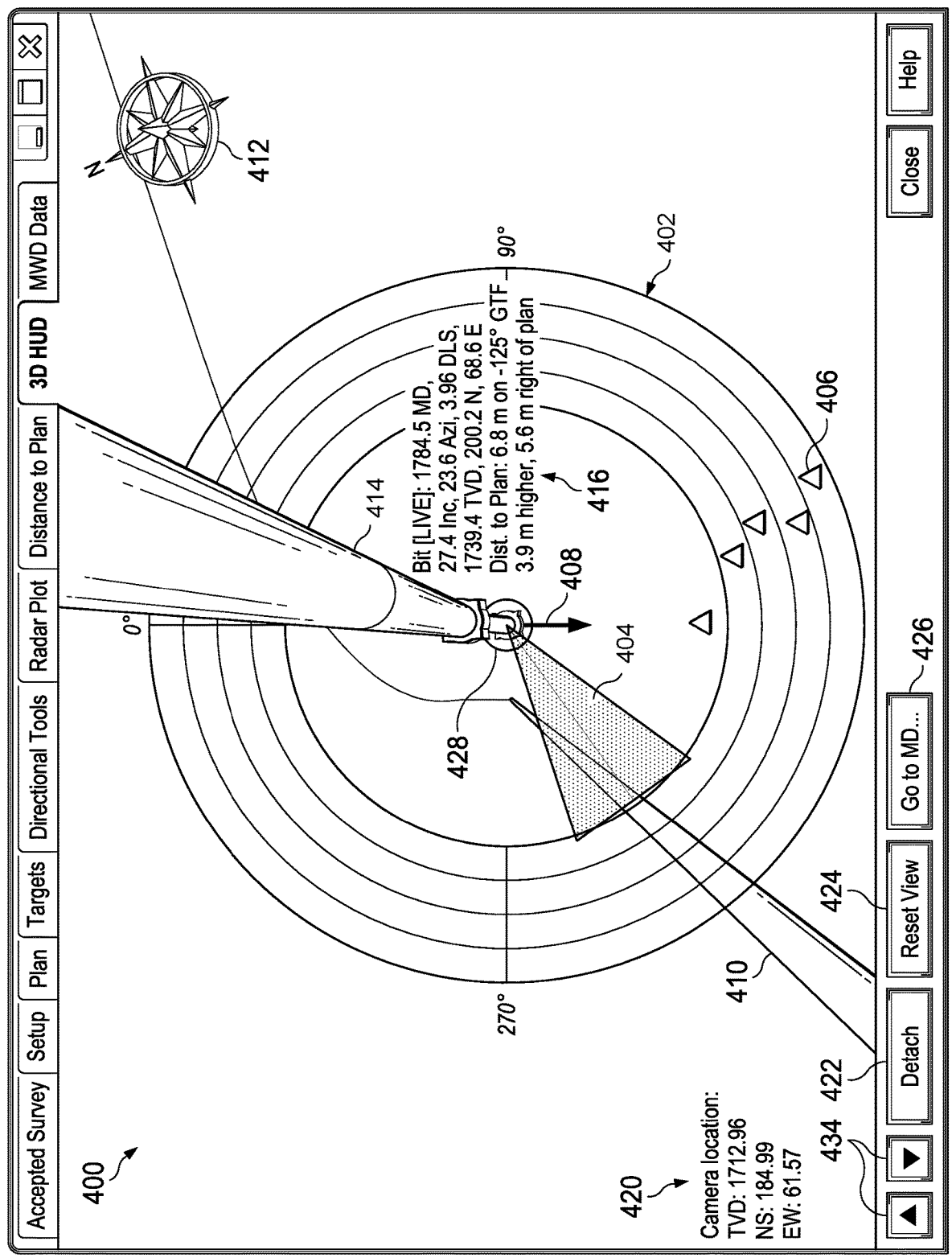
FIG. 6 is a representation of an exemplary display apparatus showing another three-dimensional visualization according to one or more aspects of the present disclosure.

FIGS. 5 and 6 show other depictions of the HMI 400. These examples show different views of implementations of three-dimensional depictions of drill plans, drilling motor and toolfaces, as well as showing some of the variations contemplated by the present disclosure. For example, index 420 shown in FIG. 6 contains data concerning the location of the simulated camera. This data allows a user to assess the location and orientation of the view of the HMI 400 as if it were a camera located in a downhole environment. Index 416 is also shown in FIGS. 5 and 6. This index 416 shows information of the location and orientation of the toolface based on the last measurement from sensors associated with the toolface. Index 416 may include similar information to index 420 of FIG. 4. FIG. 6 also shows a particularly detailed view of the depiction of the drill plan 410 and can be seen curving down and away in the view of the HMI 400.

Figure 7:
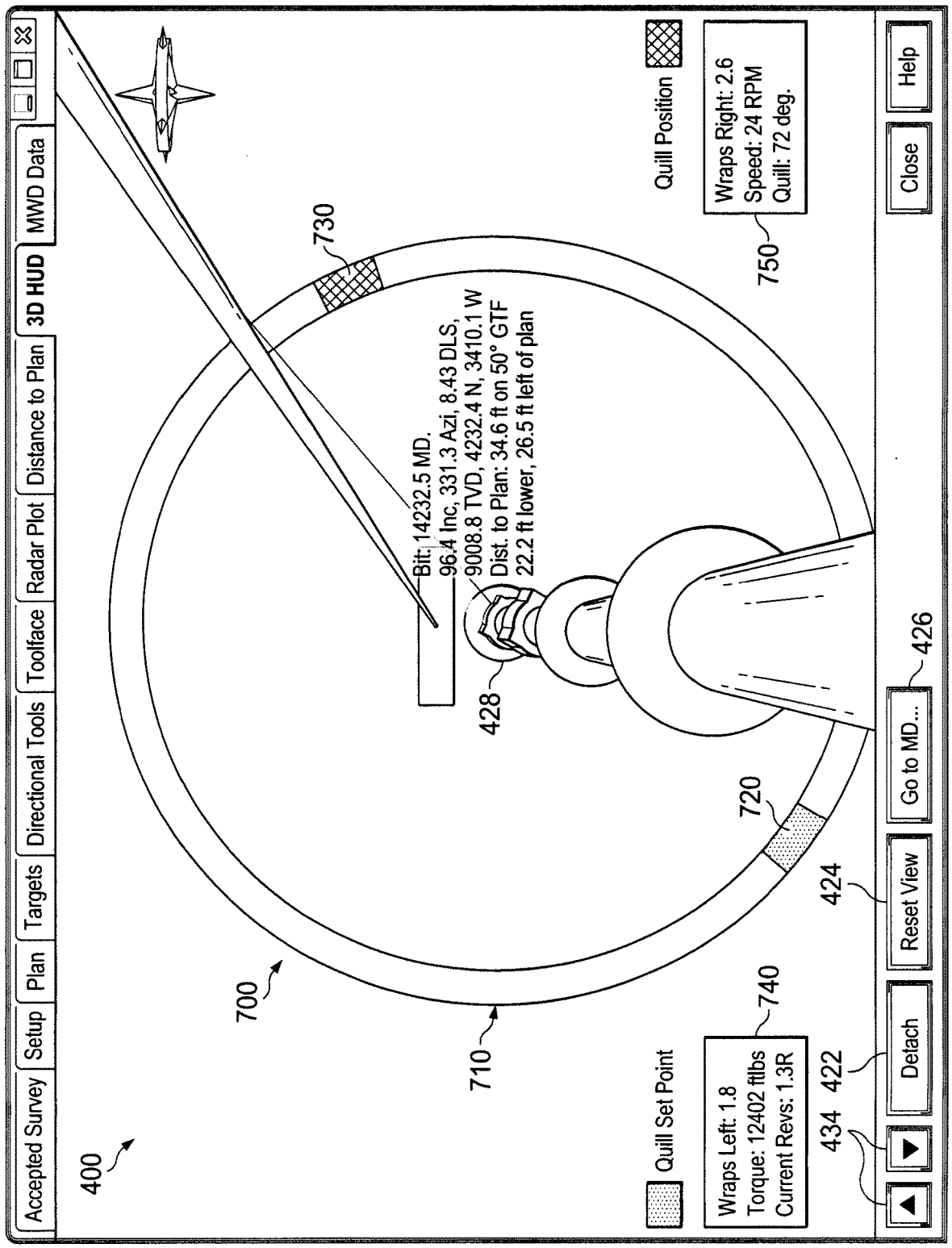
FIG. 7 is a representation of an exemplary display apparatus showing another three-dimensional visualization including a quill information dial according to one or more aspects of the present disclosure.

FIG. 7 is an exemplary representation of the HMI 400 configured to relay information about the toolface location and orientation to a user, with the addition of a quill information dial 700. The quill information dial 700 may be positioned on the HMI 400 representing a measured depth that is set back along the well path from the drilling bit 428. In some implementations, the quill information dial 700 displays properties relating to the top drive quill behavior simultaneous with the drilling operation. The quill information dial 700 may be animated and updated with real-time drilling information. In particular, the quill information dial 700 may include a ring 710 with a quill set point marker 720 and a quill position marker 730 that track around the ring 710. In the example of FIG. 7, a quill position marker 730 (which has a striped pattern) represents the position of the quill. In particular, the quill position marker 730 may show clockwise or counter-clockwise rotations of the top drill quill when the top surface system is being used to oscillate the drill string.

The quill information dial 700 may also include a quill set point marker 720 (which has a dotted pattern). In some implementations, the quill set point marker 720 may only move in response to bearing offset commands issued by the surface system. When stationary, the quill set point marker 720 will display the originating point of the oscillation rotating movement.

The quill information dial 700 may also be accompanied by two dashboards 740, 750 which may display textual information. In some implementations, the dashboards 740, 750 display to the magnitude of the programmed oscillations of the drill bit, the oscillation speed, the torque being sensed at surface, the progress through the oscillation cycles, and other dynamically obtained drill bit information.

Figure 8:
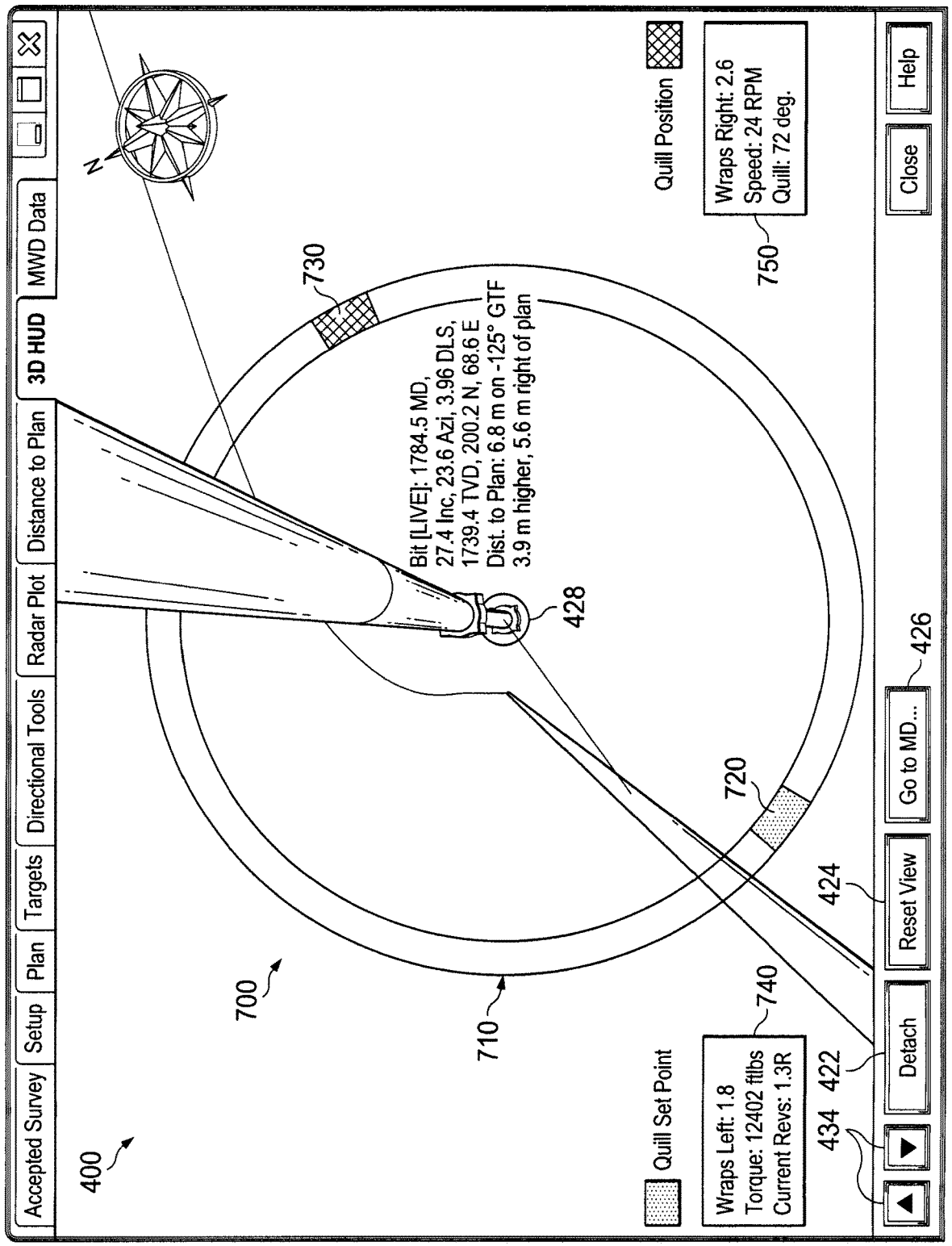
FIG. 8 is a representation of an exemplary display apparatus showing another three-dimensional visualization including an alternate quill information dial according to one or more aspects of the present disclosure.

FIG. 8 is an additional exemplary representation of an HMI 400 including a quill information dial 700 with a quill set point marker 720, a quill position marker 730, and dashboards 740, 750.

Figure 9:
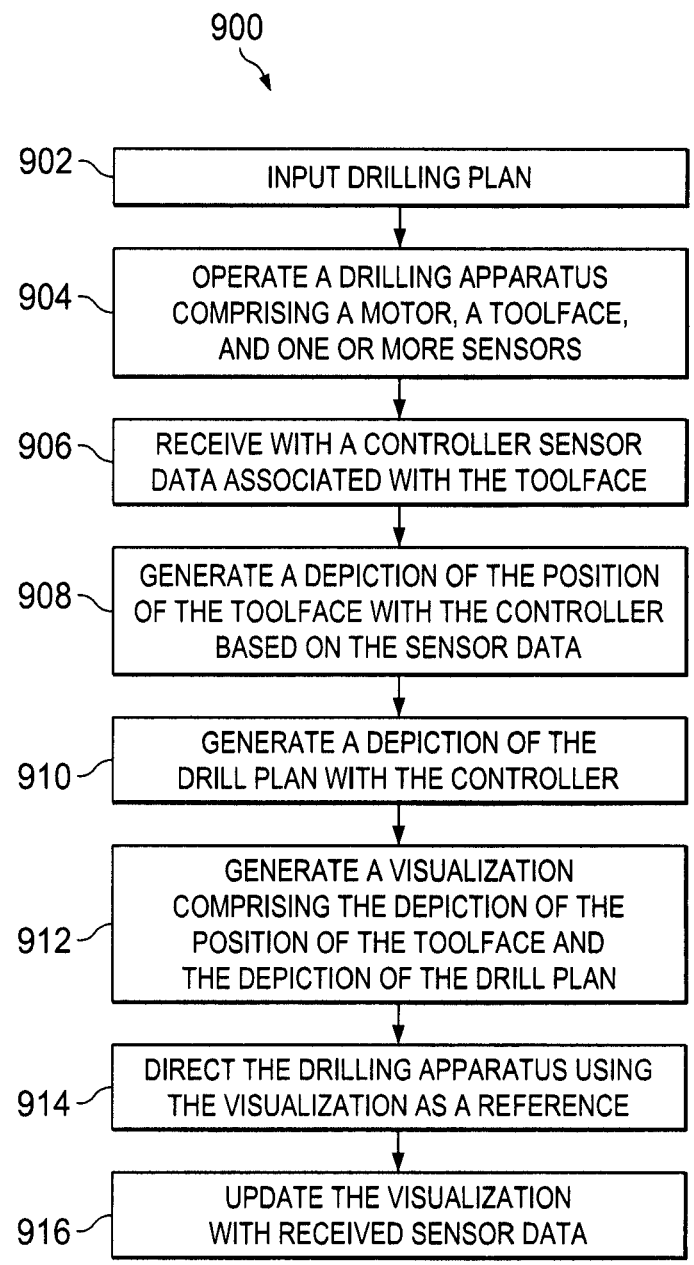
FIG. 9 is a flowchart diagram of a method of steering a drill according to one or more aspects of the present disclosure.

FIG. 9 is a flow chart showing a method 900 of steering a BHA along a downhole environment. It is understood that additional steps can be provided before, during, and after the steps of method 900, and that some of the steps described can be replaced or eliminated for other implementations of the method 900. In particular, any of the control systems disclosed herein, including those of FIGS. 1 and 2, and the displays of FIGS. 3 and 4, may be used to carry out the method 900.

At step 902, the method 900 may include inputting a drilling plan. This may be accomplished by entering location and orientation coordinates into the controller 252 discussed in conjunction with FIG. 2. The drill plan may also be entered via the user interface, and/or downloaded or transferred to controller 252. The controller 252 may therefore receive the drill plan directly from the user interface or a network or disk transfer.

At step 904, the method 900 may include operating a drilling apparatus comprising a motor, a toolface, and one or more sensors. In some implementations, this drilling apparatus is apparatus 100 discussed in conjunction with FIG. 1. The drilling apparatus may be operated by a user who inputs commands in a user interface that is connected to the drilling apparatus. The operation may include drilling a hole to advance the BHA through a subterranean formation.

At step 906, the method 900 may include receiving with a controller sensor data associated with the toolface. This sensor data can originate with sensors located near the toolface in a downhole location, well as sensors located along the drill string or on the drill rig. In some implementations, a combination of controllers, such as those in FIG. 2, receive sensor data from a number of sensors via electronic communication. The controllers then transmit the data to a central location for processing.

At step 908, the method 900 may include generating a depiction of the position of the toolface with the controller based on the sensor data. This depiction may be a visual representation as shown on the two-dimensional display shown in FIG. 3. This depiction may be accompanied with associated positional data that is displayed in a textual format.

At step 910, the method 900 may include generating a depiction of the drill plan with the controller. This depiction can be a three-dimensional depiction of the drill plan such as that shown in FIGS. 4-6. The depiction can also be a three-dimensional depiction of the actual drill path (referenced as drill history) to visually indicate to a user the distance and direction to the drill plan.

At step 912, the method 900 may include generating a visualization comprising the depiction of the position of the toolface and the depiction of the drill plan. This visualization can appear as a simulated camera view such as that shown in HMI 400 in FIGS. 4-6. In some implementations, the method can further include generating visualizations to show variation between the position of the toolface and the depiction of the drill plan. In particular, indicators such as the advisory segment 404 and indicator 408 may be included in the visualizations to indicate a recommended steering path for moving the toolface and thus the drilling motor toward the drilling plan.

At step 914, the method 900 may include directing the drilling apparatus using the three-dimensional visualization as a reference. In some cases, the visualization includes aspects of both the two-dimensional display of FIG. 3 and the three-dimensional display of FIG. 4. These displays may be included on the same device and a user may be able to toggle between the displays to access information about the location and orientation of the toolface. This two-display approach may be helpful in creating a more general, intuitive view of the downhole environment while providing more specific data concerning important aspects of the toolface where needed.

At step 916, the method 900 may include updating the visualization with received sensor data. In some implementations, the visualization is updated with sensor data from surveys that are conducted at regular intervals along the route of the toolface. The visualization may also be updated at regular time intervals according received sensor data, such as every five or ten seconds, for example. In some cases, a two-dimensional overlay such as the concentric circular grid 402 and concentric rings shown in FIG. 4 is updated with time-dependent sensor data.

In an exemplary implementation within the scope of the present disclosure, the method 900 repeats after step 916, such that method flow goes back to step 906 and begins again. Iteration of the method 900 may be utilized to characterize the performance of toolface control. Moreover, iteration may allow some aspects of the visualization to be refined each time a survey is received. For example, the advisory width and direction may be refined to give a better projection to be used in steering the toolface.

In view of all of the above and the figures, one of ordinary skill in the art will readily recognize that the present disclosure introduces a drilling apparatus comprising: a drill string comprising a plurality of tubulars and a drill bit; a top drive unit configured to rotate the drill string; a first sensor system connected to the drill string and configured to detect one or more measureable parameters of the drill bit; a controller in communication with the first sensor system, wherein the controller is operable to generate a three-dimensional depiction of the location of the drill bit based on the one or more measurable parameters of the drill bit, wherein the controller is further operable to generate a three-dimensional depiction of a drill plan; and a display device in communication with the controller, the display device configured to display to an operator a visualization comprising the three-dimensional depiction of the location of the drill bit and the three-dimensional depiction of the drill plan.

In some implementations, the visualization further comprises a representation of the one or more measurable parameters of the drill bit. The one or more measureable parameters may comprise an inclination measurement, an azimuth measurement, a toolface angle, and a hole depth. The controller may be configured to generate a three-dimensional depiction of the drill string, and the visualization may further comprise the three-dimensional depiction of the drill string.

In some implementations, the controller is configured to generate an error margin measurement based on a positional difference between an advisory toolface angle and an actual toolface angle, and wherein the visualization further comprises the error margin measurement. A motor may be located between a distal end of the drill string and the drill bit that is configured to drive the drill bit. The controller may be configured to identify a quill position, and the visualization may further comprise a depiction of the quill position. A second sensor system in communication with the top drive unit may also be included, wherein the second sensor system is configured to receive one or more operational parameters of the drill string. The controller may be in communication with the second sensor system, wherein the controller may be operable to generate a three-dimensional depiction of the drill string based on the one or more measurable parameters of the drill bit and the one or more operational parameters of the drill string.

In some implementations, the controller is configured to generate a three-dimensional depiction of a plurality of prior drill string positions, and the visualization further comprises the three-dimensional depiction of the plurality of prior drill string positions. The controller may be configured to generate a positional trend of the drill string based on the plurality of prior drill string positions, and the visualization may further comprise the positional trend of the drill string based on the plurality of prior drill string positions. The controller may be configured to generate a two-dimensional overlay representing the plurality of prior drill string positions centered on the three-dimensional depiction of the plurality of prior drill string positions, and the visualization may further comprise the two-dimensional overlay.

An apparatus for steering a bottom hole assembly may also be included comprising: a controller configured to receive data representing measured parameters indicative of positional information of a bottom hole assembly comprising a drill bit on a drill string in a downhole environment, wherein the controller is operable to generate a three-dimensional depiction of a most recent drill bit position based on the measured parameters indicative of positional information, wherein the controller is further configured to generate a three-dimensional depiction of a drill plan, the controller being arranged to receive and implement steering changes from an operator to steer the drill string; and a display in communication with the controller viewable by an operator, the display configured to display a visualization comprising the three-dimensional depiction of the most recent drill bit position and the three-dimensional depiction of the drill plan.

In some implementations, the measured position of the drill bit is based on one or more of an inclination measurement, an azimuth measurement, a toolface angle, and a hole depth. The controller may be configured to generate a three-dimensional depiction of a drill string, and the visualization may further comprise the three-dimensional depiction of the drill string. The controller may be configured to determine an error margin measurement based on a positional difference between an advisory toolface angle and the actual toolface angle, and the visualization may further comprise the error margin measurement.

In some implementations, the controller is configured to generate a three-dimensional depiction of a plurality of prior drill string positions, and wherein the visualization further comprises a depiction of the plurality of prior drill bit positions. The controller may be configured to determine a positional trend of the drill bit based on the plurality of prior drill bit positions, and the visualization may further comprise the positional trend of the drill bit. The controller may be configured to generate a two-dimensional overlay representing the plurality of prior drill bit positions centered on the three-dimensional depiction of the most recent drill bit position, and the visualization may further comprise the two-dimensional overlay centered on the three-dimensional depiction of the most recent drill bit position.

A method of directing the operation of a drilling system may also be included, comprising: inputting a drill plan into a controller in communication with the drilling system; driving a bottom hole assembly comprising a drill bit disposed at an end of a drill string; receiving sensor data from one or more sensors adjacent to or carried on the bottom hole assembly; calculating, with the controller, a position of the drill bit based on the received sensor data; calculating, with the controller, a positional difference between the drill plan and the calculated position of the drill bit; displaying a three-dimensional visualization based on the drill plan, the sensor data, and the calculated position of the drill bit; and using the display as a reference in directing a change of position of the drill bit.

In some implementations, the sensor data comprises one or more of an inclination measurement, an azimuth measurement, a toolface angle, and a hole depth measurement. The visualization further may comprise a three-dimensional depiction of the calculated position of the drill bit and a three-dimensional depiction of the drill plan. The visualization may further comprise an error margin measurement based on a positional difference between an advisory toolface angle and an actual toolface angle.

In some implementations, the visualization further comprises a depiction of a plurality of prior drill bit positions. The visualization may further comprise a positional trend of the drill bit based on the plurality of prior drill bit positions. The visualization may further comprise a two-dimensional overlay representing the plurality of prior drill bit positions centered on a three-dimensional depiction of a calculated position of the drill bit.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A drilling apparatus comprising:
   a drill string comprising a plurality of tubulars and a drill bit;
   a top drive unit configured to rotate the drill string;
   a first sensor system connected to the drill string and configured to detect one or more measurable parameters of the drill bit;
   a controller in communication with the first sensor system, wherein the controller is operable to generate a three-dimensional depiction of a location of the drill bit based on the one or more measurable parameters of the drill bit, wherein the controller is further operable to generate a three-dimensional depiction of a drill plan; and
   a display device in communication with the controller, the display device configured to display to an operator a visualization of an underground environment from a viewpoint looking down the drill string, the visualization comprising the three-dimensional depiction of the location of the drill bit down the drill string from the viewpoint and the three-dimensional depiction of the drill plan from the viewpoint in real time, the visualization comprising a positional difference between the three-dimensional depiction of the location of the drill bit and the three-dimensional depiction of the drill plan, the visualization further comprising a first indicator extending from the three-dimensional depiction of the location of the drill bit from the viewpoint and indicating a direction toward the three-dimensional depiction of the drill plan, the visualization further comprising a second indicator showing a range of acceptable deviation from the indicated direction toward the three-dimensional depiction of the drill plan.

2. The drilling apparatus of claim 1, wherein the visualization further comprises a representation of the one or more measurable parameters of the drill bit.

3. The drilling apparatus of claim 1, wherein the one or more measurable parameters comprise an inclination measurement, an azimuth measurement, a toolface angle, and a hole depth.

4. The drilling apparatus of claim 1, wherein the controller is configured to generate a three-dimensional depiction of the drill string, and wherein the visualization further comprises the three-dimensional depiction of the drill string.

5. The drilling apparatus of claim 1, wherein the controller is configured to generate an error margin measurement based on a second positional difference between an advisory toolface angle and an actual toolface angle, and wherein the visualization further comprises the error margin measurement.

6. The drilling apparatus of claim 1, further comprising a motor located between a distal end of the drill string and the drill bit that is configured to drive the drill bit.

7. The drilling apparatus of claim 1, wherein the controller is configured to identify a quill position, and wherein the visualization further comprises a depiction of the quill position.

8. The drilling apparatus of claim 1, further comprising a second sensor system in communication with the top drive unit, wherein the second sensor system is configured to receive one or more operational parameters of the drill string.

9. The drilling apparatus of claim 8, wherein the controller is in communication with the second sensor system, wherein the controller is operable to generate a three-dimensional depiction of the drill string based on the one or more measurable parameters of the drill bit and the one or more operational parameters of the drill string.

10. The drilling apparatus of claim 1, wherein the controller is configured to generate a three-dimensional depiction of a plurality of prior drill string positions, and wherein the visualization further comprises the three-dimensional depiction of the plurality of prior drill string positions.

11. The drilling apparatus of claim 10, wherein the controller is configured to generate a positional trend of the drill string based on the plurality of prior drill string positions, and wherein the visualization further comprises the positional trend of the drill string based on the plurality of prior drill string positions.

12. The drilling apparatus of claim 10, wherein the controller is configured to generate a two-dimensional overlay representing the plurality of prior drill string positions centered on the three-dimensional depiction of the plurality of prior drill string positions, and wherein the visualization further comprises the two-dimensional overlay.

13. An apparatus for steering a bottom hole assembly comprising:
a controller configured to receive data representing measured parameters indicative of positional information of a bottom hole assembly comprising a drill bit on a drill string in a downhole environment, wherein the controller is operable to generate a three-dimensional visualization of an underground environment from a perspective looking down the drill string, the visualization comprising a three-dimensional depiction of a most recent drill bit position based on the measured parameters indicative of positional information and a three-dimensional depiction of a drill plan, the controller being arranged to receive and implement steering changes from an operator to steer the drill string; and
a display in communication with the controller viewable by the operator, the display configured to display the visualization comprising the three-dimensional depiction of the most recent drill bit position and the three-dimensional depiction of the drill plan, and the visualization comprising a positional difference between the three-dimensional depiction of the most recent drill bit position and the three-dimensional depiction of the drill plan from the perspective of the drill string; the visualization further comprising an indicator extending from the three-dimensional depiction of the most recent drill bit position and indicating a range of acceptable deviation from an indicated direction toward the three-dimensional depiction of the drill plan.

14. The apparatus of claim 13, wherein the measured position of the drill bit is based on one or more of an inclination measurement, an azimuth measurement, a toolface angle, and a hole depth.

15. The apparatus of claim 13, wherein the controller is configured to generate a three-dimensional depiction of a drill string, and wherein the visualization further comprises the three-dimensional depiction of the drill string.

16. The apparatus of claim 15, wherein the controller is configured to determine an error margin measurement based on a second positional difference between an advisory toolface angle and the actual toolface angle, and wherein the visualization further comprises the error margin measurement.

17. The apparatus of claim 13, wherein the controller is configured to generate a three-dimensional depiction of a plurality of prior drill bit positions, and wherein the visualization further comprises a depiction of the plurality of prior drill bit positions.

18. The apparatus of claim 17, wherein the controller is configured to determine a positional trend of the drill bit based on the plurality of prior drill bit positions, and wherein the visualization further comprises the positional trend of the drill bit.

19. The apparatus of claim 17, wherein the controller is configured to generate a two-dimensional overlay representing the plurality of prior drill bit positions centered on the three-dimensional depiction of the most recent drill bit position, and wherein the visualization further comprises the two-dimensional overlay centered on the three-dimensional depiction of the most recent drill bit position.

20. A method of directing the operation of a drilling system, comprising;
inputting a drill plan into a controller in communication with the drilling system;

driving a bottom hole assembly comprising a drill bit disposed at an end of a drill string;

receiving sensor data from one or more sensors adjacent to or carried on the bottom hole assembly;

calculating, with the controller, a position of the drill bit based on the received sensor data;

determining, with the controller, a range of acceptable deviation from the drill plan;

calculating, with the controller, a positional difference between the drill plan and the calculated position of the drill bit;

determining, with the controller, if the positional difference between the drill plan and the calculated position of the drill bit falls within the range of acceptable deviation from the drill plan;

displaying a three-dimensional visualization based on the drill plan, the sensor data, and the calculated position of the drill bit, wherein the three-dimensional visualization comprises a visual representation of an underground environment from a perspective looking down the drill string, the visualization depicting the positional difference between the drill plan and the calculated position of the drill bit and whether the positional difference between the drill plan and the calculated position of the drill falls within the range of acceptable deviation from the drill plan, the visualization further including an indicator extending from the calculated position of the drill bit and indicating an optimized path toward the drill plan; and using the display as a reference in directing a change of position of the drill bit.

21. The method of claim 20, wherein the sensor data comprises one or more of an inclination measurement, an azimuth measurement, a toolface angle, and a hole depth measurement.

22. The method of claim 20, wherein the visualization further comprises a three-dimensional depiction of the calculated position of the drill bit and a three-dimensional depiction of the drill plan.

23. The method of claim 22, wherein the visualization further comprises an error margin measurement based on a second positional difference between an advisory toolface angle and an actual toolface angle.

24. The method of claim 20, wherein the visualization further comprises a depiction of a plurality of prior drill bit positions.

25. The method of claim 24, wherein the visualization further comprises a positional trend of the drill bit based on the plurality of prior drill bit positions.

26. The method of claim 24, wherein the visualization further comprises a two-dimensional overlay representing the plurality of prior drill bit positions centered on a three-dimensional depiction of a calculated position of the drill bit.

27. The method of claim 20, further comprising displaying an updated three-dimensional visualization of the underground environment based on the changed position of the drill bit.

28. The method of claim 27, wherein the updated three-dimensional visualization comprises an updated positional difference between the drill plan and the calculated position of the drill bit and the indicator extending from the calculated position of the drill bit and indicating the optimized path toward the drill plan.

* * * * *

UNITED STATES PATENT AND TRADEMARK OFFICE
CERTIFICATE OF CORRECTION

| | | |
|---|---|---|
| PATENT NO. | : 10,672,154 B2 | Page 1 of 1 |
| APPLICATION NO. | : 15/051753 | |
| DATED | : June 2, 2020 | |
| INVENTOR(S) | : Gillan et al. | |

It is certified that error appears in the above-identified patent and that said Letters Patent is hereby corrected as shown below:

On the Title Page

Under item (12) First Named Inventor, replace "Gillen" with -- Gillan --

Item (72) Inventors, replace inventor last name "Gillen" with -- Gillan --

Signed and Sealed this
Twenty-seventh Day of September, 2022

*Katherine Kelly Vidal*

Katherine Kelly Vidal
*Director of the United States Patent and Trademark Office*